Figures 1A, 1B:
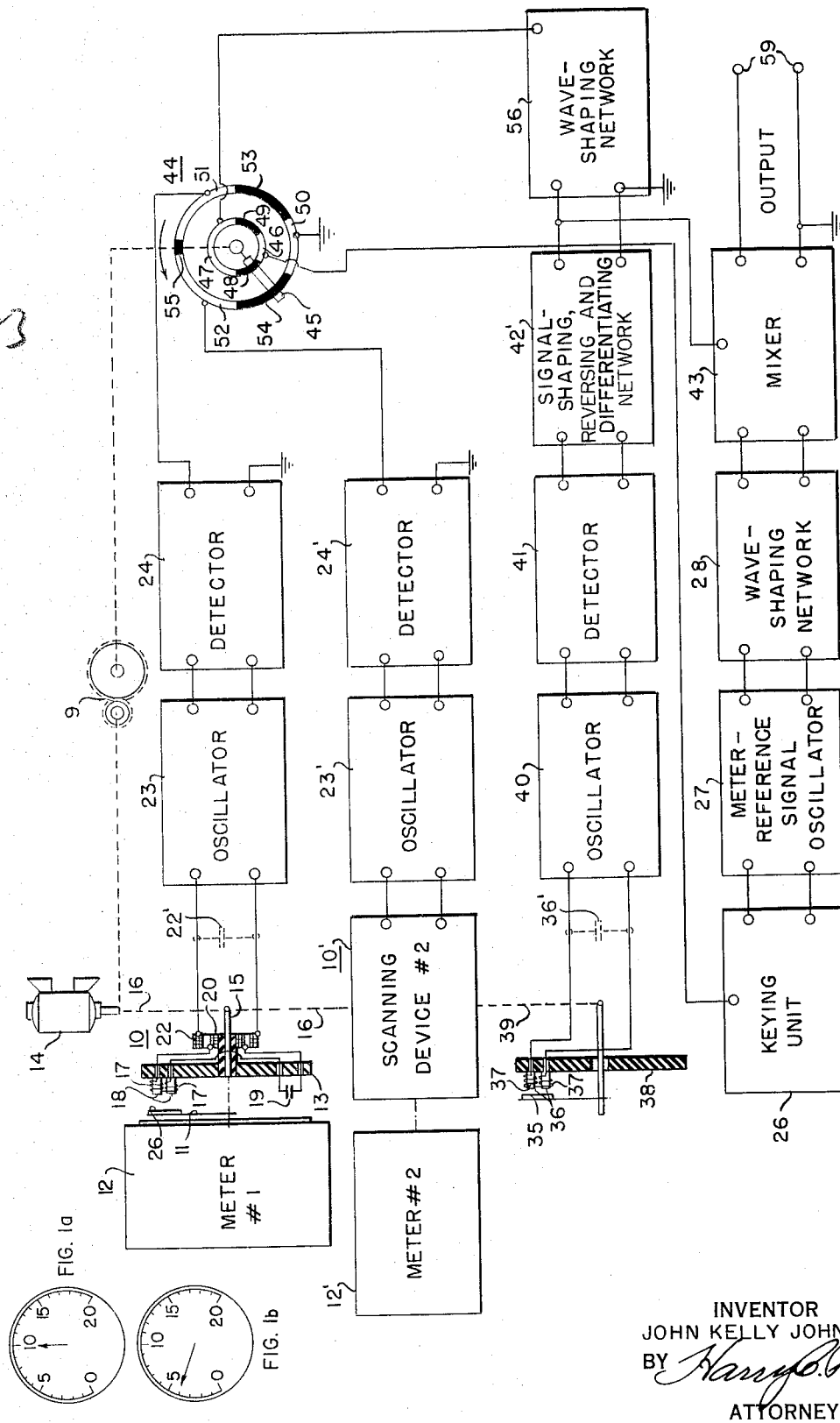

July 9, 1946.  J. K. JOHNSON  2,403,890
TELEMETERING SYSTEM
Filed Aug. 24, 1943  3 Sheets-Sheet 1

FIG. I

INVENTOR
JOHN KELLY JOHNSON
BY Harry O. Page
ATTORNEY

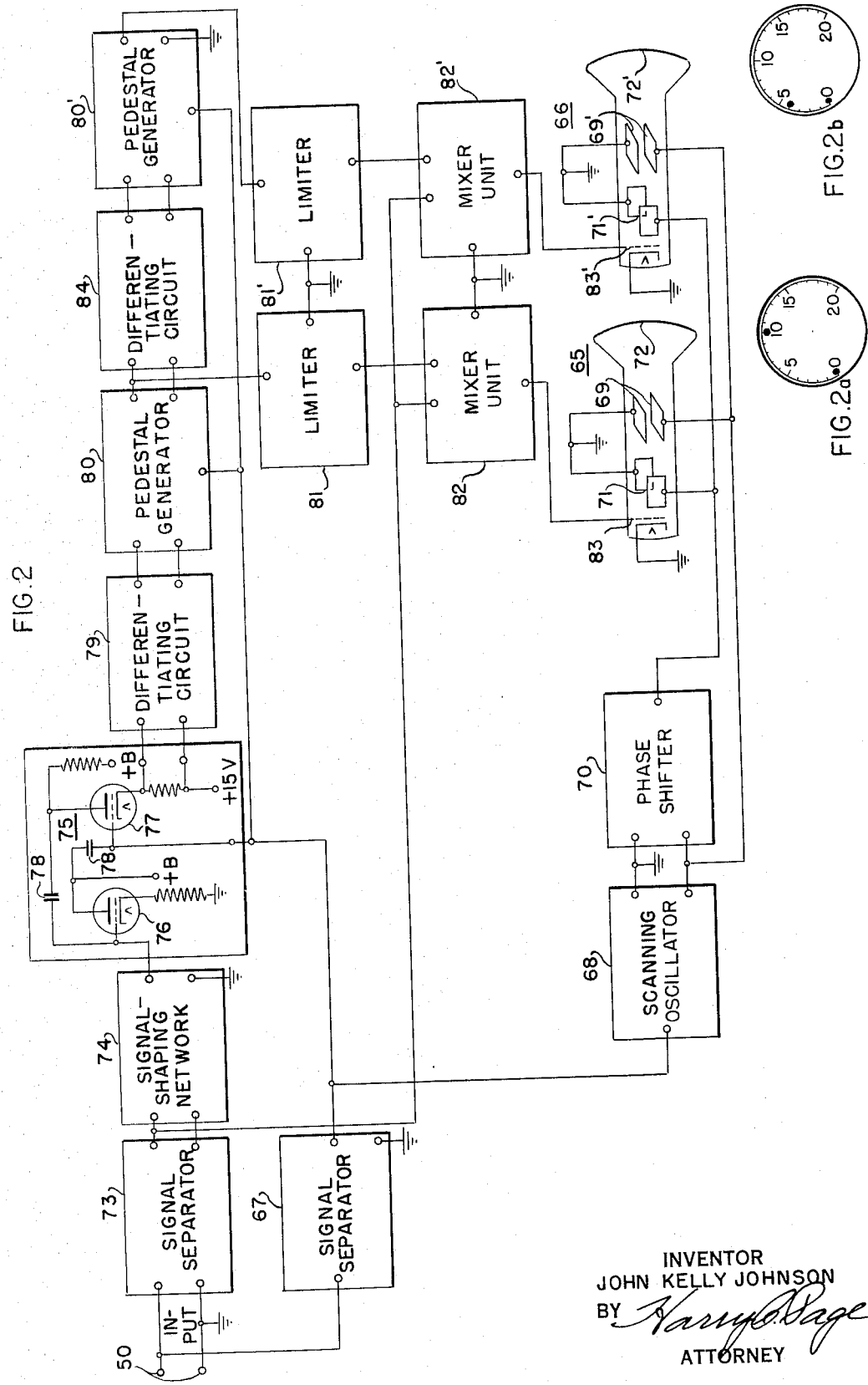

INVENTOR
JOHN KELLY JOHNSON
BY *Harry C. Page*
ATTORNEY

Patented July 9, 1946

2,403,890

UNITED STATES PATENT OFFICE 2,403,890

TELEMETERING SYSTEM

John Kelly Johnson, Douglaston, N. Y., assignor, by mesne assignments, to Hazeltine Research, Inc., Chicago, Ill., a corporation of Illinois Application August 24, 1943, Serial No. 499,770

16 Claims. (Cl. 177—351)

This invention relates to a telemetering system and more particularly to a telemetering system for developing a composite signal representative of the indications of a plurality of meters and transmitting the developed signal for reproduction at a remote point.

An important application of telemetering involves the determination of the progress of an airplane in flight by deriving information from the meters on its instrument board and transmitting that information for reproduction at a control station which is generally remote from the airplane. For such purposes, it is particularly desirable, and often imperative, that the weight and physical dimensions of the telemetering equipment on the aircraft be kept to a minimum. It is, therefore, expedient to use existing radio transmitters for sending this information to the control station, thereby to effect a reduction in weight and in cost. Corresponding savings also result at the receiving station of such a system. The use of conventional transmitters and receivers does, however, demand a telemetering signal or signals which can be translated within the audio-frequency band.

Telemetering systems employing conventional television principles have been proposed, but are limited in their application because of the extensive space requirements for the rather elaborate equipment which is necessary and also because of the need for a wide transmission band. Furthermore, the range of transmission at the frequencies employed in television systems is limited to the line-of-sight distance between the transmitter and receiver, which distance is relatively small in comparison with the range of modern aircraft.

It is an object of the invention, therefore, to provide an improved telemetering system which avoids one or more of the above-mentioned disadvantages of the arrangements which heretofore have been employed.

It is another object of the invention to provide a telemetering system which is particularly well adapted for use with conventional audio-signal radio transmitters and receivers.

It is a further object of the invention to provide a telemetering system including transmission and receiving equipment which is comparatively light in weight and compact in design.

In accordance with a feature of the invention, a telemetering system for developing a composite signal representative of the indications of a plurality of meters comprises scanning means for developing successive electrical signals of one type representative of reference and indication points for each of these meters. The system also comprises means operating synchronously with the aforesaid scanning means for developing electrical synchronizing signals of a different type, means operating synchronously with the above-mentioned scanning means for developing meter-reference signals having an electrical characteristic rendering them separable from the above-mentioned signals, and means for combining the signals into a composite signal for transmission.

In accordance with another feature of the invention, a telemetering system of the above-mentioned type additionally comprises means for transmitting the composite signal to a remote point, a signal-reproducing means at the remote point, and means for utilizing the above-mentioned synchronizing signals to synchronize the reproducing means. Means responsive to the above-mentioned meter-reference signals is employed for effectively separating the reference and indication signals corresponding to each of the meters from the composite signal. The arrangement also includes means for applying each of the corresponding separated reference and indication signals to the reproducing means for reproduction.

For a better understanding of the present invention, together with other and further objects thereof, reference is had to the following description taken in connection with the accompanying drawings, and its scope will be pointed out in the appended claims.

In the accompanying drawings: Fig. 1 is a circuit diagram in schematic form of the transmitter portion of the telemetering system of the invention; Figs. 1a and 1b, respectively, represent the meter faces of the Fig. 1 arrangement; Fig. 2 is a circuit diagram of the receiver portion of the systems; Figs. 2a and 2b, respectively, represent portions of the reproducing system of the receiver of Fig. 2; while Fig. 3 comprises graphs showing the character and timing of the signals developed in various units of the telemetering arrangement.

Referring now to Fig. 1, there is shown a telemetering system for developing a composite signal representative of the indications of a plurality of meters. The system comprises a scanning means for developing successive electrical signals of one type representative of reference and indication points for each of the meters of the system. The portion of this last-named means which is provided for developing the signal representative of the indication of one of the meters 12 comprises a mechanical means 10 for electrically scanning an indicator 11 of the meter 12 by movement of the scanning means relative to the meter indicator. The means 10 comprises a rotary support 13 which is positioned adjacent the indicator 11 of the meter 12 and which is driven by a motor 14 coupled to a shaft 15. To simplify the illustration, this mechanical coupling is indicated by the broken line 16. Radially disposed winding means 17, which preferably comprises one or more coils of a material such as copper, is mounted on the rotor 13 with the axes of the several portions thereof substantially parallel to the shaft 15. The winding means 17 is electrically connected to a condenser 19 and to a winding 20 which is secured on rotor 13 to form a series-resonant or tuned circuit. A stationary winding 22 is disposed adjacent winding 20 in a manner to provide a magnetic coupling between the electrical scanning means including windings 17 and a means for supplying oscillations thereto comprising an oscillator 23. Across the leads to stationary winding 22 there exists an inherent capacitance represented by dotted condenser 22'. Winding 22 and capacitance 22' form a parallel-resonant circuit. The telemetering arrangement for scanning meter 12 also comprises a means for deriving a signal in response to the influence of the indicator 11 at the position of the indicator on the dial of the meter. This means comprises a detector 24 of conventional design which is connected to the scanning means 10 through the oscillator 23 and the stationary winding 22. The meter indicator 11 has attached thereto a small strip 26 of material having a high-resistivity, high-permeability characteristic. The scanning means 10 and its associated elements as so far described are identical with corresponding elements described and claimed in United States application Serial No. 499,769, filed August 24, 1943, in the name of Michael J. Di Toro, and corresponding reference numerals indicate similar elements in the two disclosures insofar as the scanning means 10 is concerned.

Similarly, there is provided an arrangement for developing successive electrical signals representative of the indication of a second meter 12'. This last-named arrangement comprises a similar group of elements including a meter 12', a scanning device 10', an oscillator 23' and a detector 24'.

The telemetering arrangement of Fig. 1 includes also means operating synchronously with the scanning means 10 and 10' for developing electrical reference signals for each of the meters. This means comprises a rotatable indicator 35 for electrically scanning a fixed reference point. The fixed point is established by a pair of windings 36, 36 provided with powdered iron cores 37, 37 and disposed on a stator or support 38. The indicator 35, which is preferably similar to the above-described indicator 11, is driven by the motor 14 in a conventional manner, the driving connection being represented by the broken line 39. The rotary scanning means 10 and the indicator 35, therefore, have corresponding movements relative to the stationary elements. Across the leads to windings 36, 36 there exists an inherent capacitance represented by the dotted condenser 36'. Windings 36, 36 and equivalent condenser 36' form a parallel-resonant circuit. The windings 36 are connected in circuit with an oscillator 40, a detector 41 and a signal-shaping, reversing and differentiating network 42'. The reference-signal generator which has just been described is also similar to that shown in the above-mentioned application of Michael J. Di Toro.

The arrangement of Fig. 1 also includes means dependent upon the scanning means driven by motor 14 for developing electrical synchronizing signals of a polarity opposite to that of the reference and indication signals described above and, therefore, of a different type. This last-named means also includes the driven indicator 35 and associated elements, oscillator 40 and detector 41, as well as a differentiating circuit in waveshaping network 42', so that, for a single pulse applied to the input circuit thereof, a negative output pulse is obtained corresponding to the leading edge of the input pulse and a positive output pulse is obtained corresponding to the trailing edge of the input pulse. Such differentiating networks are well understood by those skilled in the art, rendering a further description thereof unnecessary.

The arrangement of Fig. 1 also includes means operating synchronously with the scanning means driven by motor 14 for developing meter-reference signals having an electrical characteristic rendering them separable from any of the signals mentioned above. This last-named means comprises a meter-reference signal generator or oscillator 27 adapted to be keyed into operation by a keying unit 26. A wave-shaping network 28 is coupled to the output circuit of oscillator 27. Meter-reference signal oscillator 27 preferably generates signals which are of a substantially higher repetition rate than any of the signals generated by the elements described above.

The system of Fig. 1 also includes means for combining the above-mentioned signals into a composite signal for transmission. A commutator or distributor device 44 is provided for connecting certain of the above-mentioned signal generators to an input circuit of a signal mixer device 43 only at predetermined required times. The mixer 43 is preferably so designed as to limit the amplitudes of the components of the composite signal corresponding to the meter-reference signal and meter-indication signals to a predetermined value. The distributor device 44 comprises a shaft adapted to be driven by motor 14 at one-third the speed of scanning device 10 through a gear reduction device 9. Motor 14 thus comprises a common driving means for the scanning devices 10 and 10' and the distributor device 44. Connected to the shaft of distributor 44 is a brush 45 which makes contact between conductive segments of two concentric stationary rings. The inner stationary ring comprises conductive segments 46 and 47 and insulating segments 48 and 49, while the outer stationary ring comprises conductive segments 50, 51 and 52 and insulating segments 53, 54 and 55. The output circuit of detector 24 is connected to conductive segment 51 on the outer ring and the arrangement is such that the signal output of detector 24 can be translated through the brush 45 and conductive segment 47 to the input circuit of a wave-shaping network 56, the output circuit of which is in turn coupled to an input circuit of mixer 43. Similarly, the output circuit of detector 24' is coupled to conductive segment 52 and the signal output of detector 24' can thus be translated through conductive segment 47 to the input circuit of wave-shaping network 56. The output circuit of detector 41 is coupled to an input circuit of mixer 43 through wave-shaping network 42′, while the output circuit of oscillator 27 is also coupled to an input circuit of the mixer 43 through the wave-shaping network 28. The keying device 26 is of a type adapted to be energized by the completion of a connection to ground from an input circuit thereof through the conductive segment 46, the brush 45, and the conductive segment 50, which is grounded.

Figure 3:
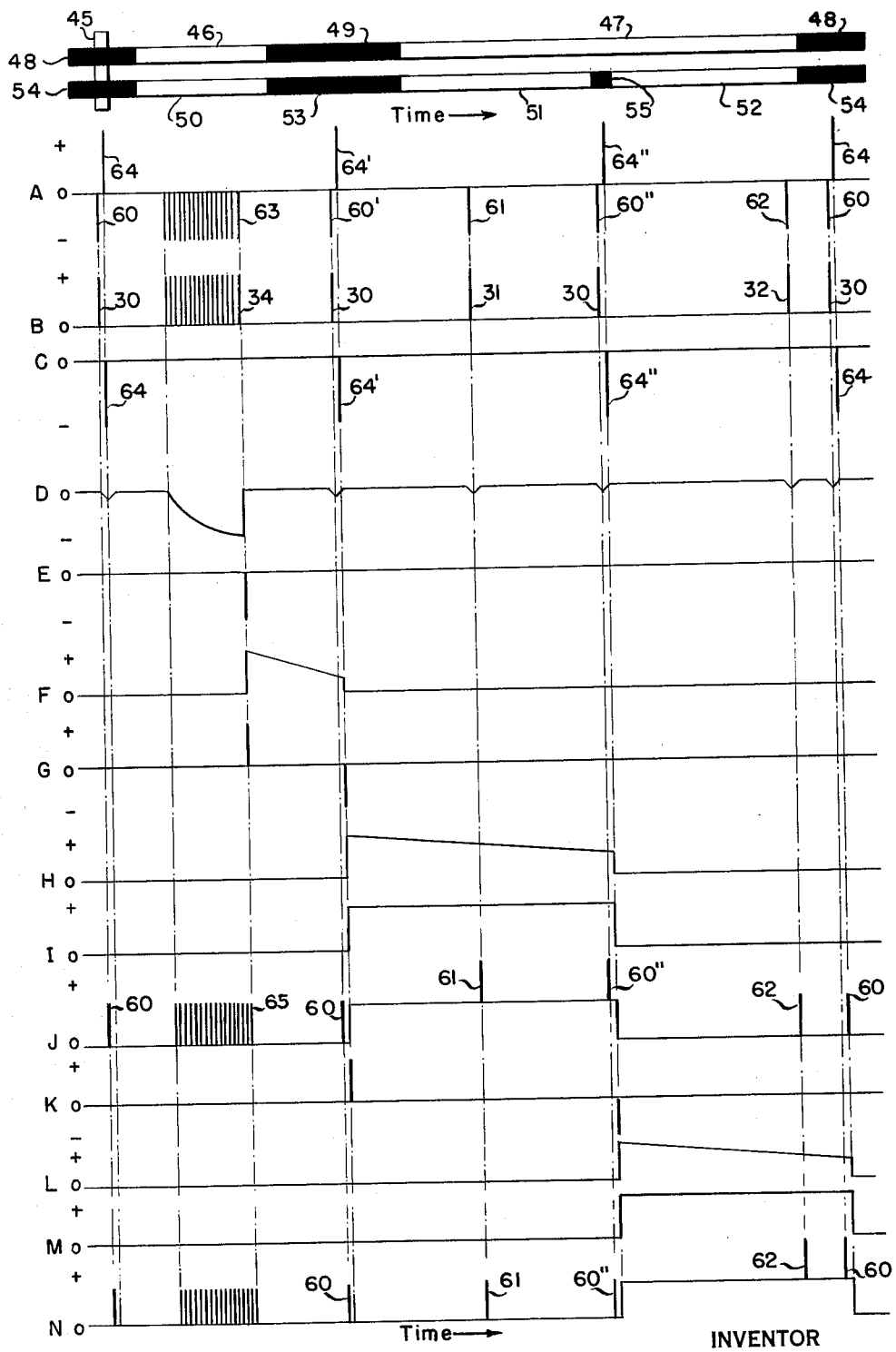

Reference is made to curve A of Fig. 3 in connection with the description of the operation of the composite-signal generator of Fig. 1. Curve A illustrates the signal output obtained from mixer 43. This signal output comprises negative reference signals 60, 60′ and 60″ and negative meter-indication signals 61 and 62 for meter 12 and meter 12′, respectively. The signal also comprises negative meter-reference signals 63 of relatively high repetition rate and positive synchronizing signals comprising pulses 64, 64′ and 64″.

A linear layout of the commutator arrangement 44 is shown just above curve A of Fig. 3 and will be used in describing the operation of the signal generator of Fig. 1. It will be seen that, with the brush 45 in the position indicated, only the insulating segments 48 and 54 are bridged by the brush. However, the mechanical phasing of the various mechanically coupled elements driven by motor 14 is such that, during this interval, the indicator 35 is driven past the windings 36. The effect of this is to cause an amplitude change in the signal output of oscillator 40 due to the fact that the indicator 35, when in proximity with the windings 36, causes the resistance reflected into tuned circuit 36, 36′ to change. The operation of indicator 35 is fully described in the above-identified application of Michael J. Di Toro, and the amplitude variations thus produced are detected by detector 41 to derive a narrow pulse which is applied to the input circuit of wave-shaping, reversing and differentiating network 42′. As above described, unit 42′ is such as to provide a negative pulse corresponding to the leading edge of such a signal input thereto and a positive pulse corresponding to the trailing edge of such a signal input thereto. The pulse 60 of curve A thus represents the negative pulse which is so generated, and the pulse 64 thus represents the positive pulse which is so generated.

As the brush 45 is driven in a counterclockwise rotation, conductive segments 46 and 50 are bridged, completing the keying circuit for oscillator 27, thereby to develop a signal output therefrom consisting of a series of high-frequency oscillations as indicated at 63 in curve A. These signals are translated through the mixer element 43 to the output circuit for transmission. As the brush 45 continues to rotate, insulating segments 49 and 53 are bridged and, during this interval, the synchronizing-signal generator is again effective to develop a negative reference pulse 60′ and a positive synchronizing pulse 64′ in exactly the same manner that pulses 60 and 64 were generated.

During the next phase of distributor action, conductive segments 47 and 51 are bridged and, during this interval, the meter indicator 11 is scanned by the driven windings 17, 17, thereby to modulate the signal output of oscillator 23 in a manner similar to that described above and which is fully explained in the above-identified application of Michael J. Di Toro. This amplitude-modulation is detected by detector 24 and is shaped in wave-shaping network 56 to provide a narrow pulse indicating signal, as represented by pulse 61 of curve A, this pulse being translated from the output circuit of network 56 through the mixer 43 to the output terminals of the system and the amplitude of this pulse preferably being limited to a predetermined value by mixer 43.

During the portion of the rotation that the brush 45 bridges conductor 47 and insulating segment 55, no circuit is completed through the distributor 44. However, during this interval the reference signal or pulse 60″ and the synchronizing pulse 64″ are generated as described above in connection with reference signal 60 and synchronizing pulse 64.

During the interval when conductive segment 47 and conductive segment 52 are bridged by the bar 45, the indicator of meter 12′ is scanned by scanning device 10′ in a manner identical to that described above in connection with meter 12 and the indication pulse 62 is derived in the output circuit of wave-shaping network 56. This pulse is translated through the mixer 43 to the output terminals 59 and the amplitude of this pulse is preferably limited to a predetermined value by mixer 43. During the next operating phase of commutator 44, the insulating segments 48 and 54 are again bridged and the cycle just described begins anew.

In Fig. 2 there is illustrated the receiver portion of the system of the invention which is suitable for visually reproducing the composite signal output of the Fig. 1 transmitter. The receiver of Fig. 2 includes a signal-reproducing means comprising cathode-ray tubes 65 and 66, together with means for utilizing the synchronizing-signal components of the composite signal to synchronize these reproducing means. This synchronizing arrangement comprises a signal separator 67 adapted to derive the positive synchronizing pulses 64, 64′ and 64″ of the translated composite signal and to supply them to a scanning oscillator 68 which is effective to provide a signal output of sine-wave form and of the frequency of the synchronizing pulses. The signal output of scanning oscillator 68 is applied directly to one set of scanning elements or plates 69, 69 of cathode-ray tube 65 and is applied with a 90-degree phase shift obtained in a phase shifter 70 to a second set of deflecting elements or plates 71, 71 in order to cause the cathode-ray beam of signal-reproducing device or line-tracing device 65 normally to trace a circle on a fluorescent screen 72 of the tube in a manner well understood by those skilled in the art. The cathode-ray tube 66 is similiar to cathode-ray tube 65 and like elements bear similar reference numerals with the addition, in each instance, of a prime.

The signal-reproducing means of Fig. 2 also comprises means responsive to the meter-reference signal of the composite signal for effectively separating the reference and indication signals corresponding to each of the meters from all other components of the composite signal. This last-named means comprises a signal separator 73 for effectively deriving the negative components of the composite signal and for providing at its output terminals these separated components with a positive polarity. Coupled to the output circuit of signal separator 73 is a signal-shaping network 74 which includes an integrating network adapted to respond only to the relatively large energy content of the meter-reference signal and which includes also a following differentiating network effective to derive a pulse corresponding in timing to the trailing edge of the signal derived by integration. These circuits may be conventional and are, per se, well understood by those skilled in the art.

There is coupled to the output circuit of signal-shaping network 74 a pulse generator 75 of the well-known multivibrator type. The pulse generator 75 thus comprises vacuum tubes 76 and 77, each having its anode circuit coupled to the grid circuit of the other through the condensers 78, 78, the arrangement being such that its cycle is initiated by the sharp pulse output from signal-shaping network 74 which is applied to the input circuit of tube 76. Synchronizing signals from signal separator 67 are applied to the input circuit of the second tube 77 of the multivibrator in order to fire tube 77 with the first synchronizing pulse following the time when tube 76 is fired. A differentiating circuit 79 is coupled to the output circuit of pulse generator 75 in order to derive from the trailing edge of the output pulse of generator 75 a sharp negative pulse for initiating the operation of the circuit of a pulse generator or pedestal generator 80 which may be of the same type as pulse generator 75, but which is shown in schematic form. Synchronizing signals from signal separator 67 are also applied to the second tube of the pedestal or pulse generator 80. A limiter stage 81 is coupled to the output circuit of pedestal generator 80 to derive a rather broad pulse which exists during the interval when the reference and indication signal corresponding to meter 12 is translated by the system. The signal output of limiter 81 is applied to a mixer unit 82 together with the signal output from signal separator 73 in order to cause the pedestal and the signals corresponding to meter 12 to be superimposed, the control electrode 83 of cathode-ray tube 65 being connected to the output circuit of mixer unit 82.

In order effectively to separate the reference and indication signals corresponding to meter 12' from all other translated signals, a differentiating circuit 84 is provided having an input circuit coupled to pedestal generator 80 for deriving from the trailing edge of the pulse generated by pedestal generator 80 a sharp pulse. There are connected to the output circuit of the differentiating circuit 84, in the following order, a pedestal generator 80', a limiter 81', and a mixer unit 82' which correspond, respectively, to pedestal generator 80, limiter 81, and mixer unit 82 and, therefore, bear similar reference numerals primed.

Reference is made to the curves of Fig. 3 for a description of the operation of the reproducing arrangement of Fig. 2. It will be seen that the synchronizing signals of the composite signal of curve A are derived at the output circuit of signal separator 67 and are applied to the scanning oscillator 68. These synchronizing signals are represented by curve C of Fig. 3 and are utilized to cause the cathode-ray beams of the signal-reproducing devices 65 and 66 normally to trace a circle in synchronism with the scanning at the transmitter in a manner which is, per se, well understood by those skilled in the art.

The signal separator 73 is effective to provide at its output circuit positive signal components, numbered 30, 34, 30, 31, 30, 32, 30, as represented by curve B, and corresponding to the negative components of the composite signal illustrated in curve A. The integrating arrangement in signal-shaping network 74 is adapted to respond mainly to the greater energy content of the meter-reference signals 63 thereby to provide a voltage of the wave form of curve D, which voltage is differentiated in the differentiating circuit included in the network 74 to provide a sharp negative signal corresponding to the trailing edge of the broad pulse of curve D as illustrated by curve E. This negative signal when applied to tube 76 of the multivibrator 75 causes that tube to become nonconductive whereby tube 77 becomes conductive, due to the cross-coupling described above, and the following synchronizing signal, as represented by pulse 64' of curve C, which is applied to the grid circuit of the second tube 77 from signal separator 67 causes tube 77 to become nonconductive. In this manner a relatively broad pulse, as represented by curve F, is developed by pulse generator 75 which is initiated by the pulse of curve E and which is terminated by the synchronizing pulse 64' of curve C.

The broad pulse of curve F is thereafter differentiated in circuit 79 to provide a signal output of the form of curve G which is applied to the pedestal generator 80. Pedestal generator 80, operating in a manner similar to that described for pulse generator 75, is effective to derive a rather broad pulse, as shown by curve H, which is initiated by the negative component of the signal illustrated in curve G and which is terminated by the synchronizing pulse 64'' applied to the second tube of signal generator 80 from signal separator 67. Limiter 81 is effective to derive from this broad pulse a substantially flat-top pulse, as illustrated by curve I, which pulse is applied to the mixer unit 82. Inasmuch as the indication and reference signals and the meter-reference signal, as illustrated by curve B, are also applied to the mixer unit 82, there is derived in the output circuit thereof a signal of the wave form of curve J and which includes a relatively broad pulse having superimposed thereon the indication signal 61 and the reference signal 60'' which were derived during the scanning of meter 12. Inasmuch as the pulses 61 and 60'' of curve J have a greater amplitude than any other components of the signal applied to cathode-ray tube 65, which is normally biased to be nonconductive and to respond only to these signals of increased amplitude, the cathode-ray tube 65 is effective to produce two spots upon its fluorescent screen 72 which are spaced by a distance which is proportional to the spacing of pulses 61 and 60''. There is thus produced upon the face of the cathode-ray tube an indication of the general form of that shown in Fig. 2a and a suitable scale may be associated with the fluorescent screen to indicate the exact reading of meter 12. The indication produced on screen 72 generally corresponds to the indication of meter 12, which indication is illustrated in Fig. 1a. Thus, the indication produced on screen 72 comprises a luminous area at the zero scale point and also comprises another luminous area corresponding to the actual meter reading. It will be understood that the scale for screen 72 can be omitted and that the distance between the reproduced luminous areas alone can be used to provide an indication of the meter reading.

In deriving the signal components related to meter 12' and which are to be reproduced in tube 66, the differentiating circuit 84 is effective to derive a double pulse output signal of the form of curve K from the broad-pulse output signal of pedestal generator 80 and which is represented in curve H. The negative component of the signal represented by curve K, together with the synchronizing signal 64, are utilized to derive, in pedestal generator 80', a pulse output of the wave form of curve L in a manner similar to that described for pedestal generator 80 in deriving the signal output of the wave form H.

The pulse output of pedestal generator 80' is limited in limiter 81' to provide a flat-top pulse of the wave form illustrated in curve M which is thereafter applied to the mixer unit 82'. Since this last-named broad pulse occurs only during the interval when reference and indication signals corresponding to meter 12' are present in the signal, there is developed at the output circuit of mixer 82' a signal of the wave form of curve N which is reproduced in tube 66 in the same manner as described above in connection with the description of the operation relating to curve J and tube 65. The scale corresponding to meter 12' is represented in Fig. 1b and the corresponding representation reproduced on screen 72' is illustrated in Fig. 2b.

In some cases it may be found that the indicating signals 61 and 62 correspond very closely in time with one of the synchronizing pulses, as represented by pulses 64, 64' and 64'' in which case the indicating signals may be effective substantially to obscure the synchronizing signals in the composite signal. For this reason it is preferable that the synchronizing signals have an amplitude substantially greater than that of the indicating signals. It is for this reason that mixer 43 is preferably so designed as to limit the components of the composite signal corresponding to indication signals 61 and 62 to a predetermined value.

While applicant does not wish to be limited to any specific operating conditions, it has been found that the following operating parameters result in a particularly satisfactory system:

Cycles per second
Frequency of meter-reference signals derived from oscillator 27_____ 1,000
Frequency of synchronizing pulses_____ 50
Frequency of reference pulses_____ 50

In utilizing the preferred parameters given above, it will be found that all major signal components of the composite signal represented by curve A fall within the audio-frequency range and, therefore, may be translated in conventional voice-frequency communication apparatus. Therefore, when the signal generator of Fig. 1 is used in an airplane, for example, the conventional radio-communication apparatus can be utilized to translate the composite signal represented by curve A to a ground station where the signal can be received by and reproduced from a conventional radio receiver.

From the foregoing explanation of the operation of the above-described telemetering system, it will be apparent that the receiver units 74, 75, and 79–81, inclusive, in conjunction with units 84, 80', and 81' comprise the means responsive to the meter reference signals developed by oscillator 27 of the transmitter for effectively separating from the composite signal the reference and indication signals corresponding to each of the meters 12 and 12'. It will also be manifest that each of the pedestal generators 80 and 80' comprises a means responsive to the meter reference signals and the synchronizing signals for developing a pedestal pulse during a predetermined interval. Also, each of mixer units 82 and 82' comprises a means for utilizing a developed pedestal pulse for effectively separating the reference and indication signals corresponding to a particular one of the meters 12 and 12'.

While, in the arrangement shown, two meters only are included in the system, it will be apparent that the system can be extended to provide a telemetering system for any desired number of meters. Furthermore, it will be understood that many other forms of signal-reproducing apparatus are suitable for providing an indication of the meter readings once the signals corresponding to each particular meter have been effectively separated as taught by the invention.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A telemetering system for developing a composite signal representative of the indications of a plurality of meters comprising, scanning means for developing successive electrical signals of one type representative of reference and indication points for each of said meters, means operating synchronously with said scanning means for developing electrical synchronizing signals of a different type, means operating synchronously with said scanning means for developing meter-reference signals having an electrical characteristic rendering them separable from said above-mentioned signals, and means for combining said signals into a composite signal for transmission.

2. A telemetering system for developing a composite signal representative of the indications of a plurality of meters comprising, scanning means for developing successive electrical signals of a given polarity representative of reference and indication points for each of said meters, means operating synchronously with said scanning means for developing electrical synchronizing signals of a polarity opposite said given polarity, means operating synchronously with said scanning means for developing meter-reference signals having an electrical characteristic rendering them separable from the above-mentioned signals, and means for combining said signals into a composite signal for transmission.

3. A telemetering system for developing a composite signal representative of the indications of a plurality of meters comprising, scanning means for developing successive electrical signals of a given polarity representative of reference and indication points for each of said meters, means operating synchronously with said scanning means for developing electrical synchronizing signals of a polarity opposite said given polarity, means operating synchronously with said scanning means for developing meter-reference signals of said given polarity and having an electrical characteristic rendering them separable from said above-mentioned signals of said given polarity, and means for combining said signals into a composite signal for transmission.

4. A telemetering system for developing a composite signal representative of the indications of a plurality of meters comprising, scanning means for developing successive electrical signals comprising a series of time-spaced pulses and representative of reference and indicating points for each of said meters, means operating synchronously with said scanning means for developing electrical synchronizing signals comprising a series of time-spaced pulses of a polarity opposite that of said given polarity, means operating synchronously with said scanning means for developing meter-reference signals comprising a succession of closely-spaced pulses during each scansion whereby the meter-reference signals have an electrical characteristic rendering them separable from said above-mentioned signals, and means for combining said signals into a composite signal for transmission.

5. A telemetering system for developing a composite signal representative of the indications of a plurality of meters comprising, mechanical scanning means, distributor means, means including said scanning means and said distributor means for developing successive electrical signals of one type representative of reference and indication points for each of said meters, means including said scanning means and said distributor means for developing electrical synchronizing signals of a different type, means including said scanning means and said distributor means for developing meter-reference signals having an electrical characteristic rendering them separable from said above-mentioned signals, said distributing means being such as to cause each of the above-mentioned signals to be developed during a separate predetermined interval during the scanning cycle, and means for combining said signals into a composite signal for transmission.

6. A telemetering system for developing a composite signal representative of the indications of a plurality of meters comprising, mechanical scanning means, distributor means, a common driving means for said scanning means and said distributor means, means including said scanning means and said distributor means for developing successive electrical signals of one type representative of reference and indication points for each of said meters, means including said scanning means and said distributor means for developing electrical synchronizing signals of a different type, means including said scanning means and said distributor means for developing meter-reference signals having an electrical characteristic rendering them separable from said above-mentioned signals, said distributor means being such as to cause each of the above-mentioned signals to be developed during a separate predetermined interval during the scanning cycle, and means for combining said signals into a composite signal for transmission.

7. A telemetering system for developing a composite signal representative of the indications of a plurality of meters comprising, scanning means for developing successive electrical signals of a given polarity representative of reference and indication points for each of said meters, means operating synchronously with said scanning means for developing electrical synchronizing signals of a polarity opposite to that of said given polarity and of an amplitude appreciably greater than the amplitudes of said first-mentioned electrical signals, means operating synchronously with said scanning means for developing meter-reference signals having an electrical characteristic rendering them separable from said above-mentioned signals, and means for combining said signals into a composite signal for transmission.

8. A telemetering system for developing a composite signal representative of the indications of a plurality of meters comprising, scanning means for developing successive electrical signals of one type representative of reference and indication points for each of said meters and having all primary components within the audio-frequency range, means operating synchronously with said scanning means for developing electrical synchronizing signals of a different type and having all primary components within the audio-frequency range, means operating synchronously with said scanning means for developing meter-reference signals having all primary components within the audio-frequency range and having an electrical characteristic rendering them separable from said above-mentioned signals, and means for combining said signals into a composite signal for transmission.

9. A telemetering system for developing a composite signal representative of the indications of a plurality of meters and transmitting said signal for reproduction at a remote point comprising, scanning means for developing successive electrical signals of one type representative of reference and indication points for each of said meters, means operating synchronously with said scanning means for developing electrical synchronizing signals of a different type, means operating synchronously with said scanning means for developing meter-reference signals having an electrical characteristic rendering them separable from said above-mentioned signals, means for combining said signals into a composite signal and transmitting said composite signal to said remote point for reproduction, signal-reproducing means, means for utilizing said synchronizing signals to synchronize said reproducing means, means responsive to said meter-reference signals for effectively separating said reference and indication signals corresponding to each of said meters from said composite signal, and means for applying each of said corresponding separated reference and indication signals to said reproducing means for reproduction.

10. A telemetering system for developing a composite signal representative of the indications of a plurality of meters and transmitting said signal for reproduction at a remote point comprising, scanning means for developing successive electrical signals of one type representative of reference and indication points for each of said meters, means operating synchronously with said scanning means for developing electrical synchronizing signals of a different type, means operating synchronously with said scanning means for developing meter-reference signals having an electrical characteristic rendering them separable from said above-mentioned signals, means for combining said signals into a composite signal, means for transmitting and receiving said composite signal, a line-tracing device associated with said receiving means, means for utilizing said synchronizing signals to synchronize the line traced by said device with said scanning means, means dependent upon said meter-reference signals for effectively separating said reference and indication signals corresponding to a particular meter, and means for applying said last-named separated signals to said reproducing device to vary the line traced by said device thereby to produce an indication of said separated signals.

11. A telemetering system for developing a composite signal representative of the indications of a plurality of meters and transmitting said signal for reproduction at a remote point comprising, scanning means for developing successive electrical signals of one type representative of reference and indication points for each of said meters, means operating synchronously with said scanning means for developing electrical synchronizing signals of a different type, means operating synchronously with said scanning means for developing meter-reference signals having an electrical characteristic rendering them separable from said above-mentioned signals, means for combining said signals into a composite signal, means for transmitting and receiving said composite signal, means associated with said receiving means for deriving said meter-reference signal, means for utilizing said derived meter-reference signal for separating said reference and indication signals for a particular meter, signal-reproducing means, means for synchronizing said signal-reproducing means with said synchronizing signals, and means for applying said separated reference and indication signals corresponding to said particular meter to said reproducing means for reproduction.

12. A telemetering system for developing a composite signal representative of the indications of a plurality of meters and transmitting said signal for reproduction at a remote point comprising, scanning means for developing successive electrical signals of one type representative of reference and indication points for each of said meters, means operating synchronously with said scanning means for developing electrical synchronizing signals of a different type, means operating synchronously with said scanning means for developing meter-reference signals having an electrical characteristic rendering them separable from said above-mentioned signals, means for combining said signals into a composite signal, means for transmitting and receiving said composite signal, a signal-reproducing means associated with said receiving means, means for utilizing said synchronizing signals to synchronize said reproducing means, means responsive to said meter-reference signals for developing a pedestal pulse during a predetermined interval, means for utilizing said pedestal pulse for effectively separating said reference and indication signals corresponding to a particular meter, and means for applying said separated reference and indicating signals to said reproducing means for reproduction.

13. A telemetering system for developing a composite signal representative of the indications of a plurality of meters and transmitting said signal for reproduction at a remote point comprising, scanning means for developing successive electrical signals of one type representative of reference and indication points for each of said meters, means operating synchronously with said scanning means for developing electrical synchronizing signals of a different type, means operating synchronously with said scanning means for developing meter-reference signals having an electrical characteristic rendering them separable from said above-mentioned signals, means for combining said signals into a composite signal, means for transmitting and receiving said composite signal, a signal-reproducing means associated with said receiving means, means for utilizing said synchronizing signals to synchronize said reproducing means, means responsive to said meter-reference signal and to said synchronizing signals for developing a pedestal pulse during a predetermined interval, means for utilizing said pedestal pulse for effectively separating said reference and indication signals corresponding to a particular meter, and means for applying said separated reference and indication signals to said reproducing means for reproduction.

14. In a telemetering system for reproducing a composite signal representative of the indications of a plurality of meters and including signals of one type representative of reference and indication points for each of the meters, electrical synchronizing signals of a different type and meter-reference signals having an electrical characteristic rendering them separable from said above-mentioned signals, a signal-reproducing means comprising, means for utilizing said synchronizing signals to synchronize said reproducing means, means responsive to said meter-reference signals for effectively separating from said composite signals said reference and indication signals corresponding to a particular meter, and means for applying said separated reference and indication signals to said reproducing means for reproduction.

15. In a telemetering system for reproducing a composite signal representative of the indications of a plurality of meters and including signals of one type representative of reference and indication points for each of the meters, electrical synchronizing signals of a different type and meter-reference signals having an electrical characteristic rendering them separable from said above-mentioned signals, a signal-reproducing means comprising, means for utilizing said synchronizing signals to synchronize said reproducing means, means responsive to said meter-reference signals for developing a pedestal pulse during a predetermined interval, means for utilizing said pedestal pulse for effectively separating said reference and indication signals corresponding to a particular meter, and means for applying said separated reference and indication signals to said reproducing means for reproduction.

16. In a telemetering system for reproducing a composite signal representative of the indications of a plurality of meters and including signals of one type representative of reference and indication points for each of the meters, electrical synchronizing signals of a different type and meter-reference signals having an electrical characteristic rendering them separable from said above-mentioned signals, a signal-reproducing means comprising, means for utilizing said synchronizing signals to synchronize said reproducing means, means responsive to said meter-reference signals and to said synchronizing signals for developing a pedestal pulse during a predetermined interval, means for utilizing said pedestal pulse for effectively separating said reference and indication signals corresponding to a particular meter, and means for applying said separated reference and indication signals to said reproducing means for reproduction.

JOHN KELLY JOHNSON.